United States Patent
Parviainen et al.

(10) Patent No.: US 6,264,405 B1
(45) Date of Patent: Jul. 24, 2001

(54) METHOD AND DEVICE FOR DRILLING HOLES INTO THE MANTLE OF A CYLINDER OR EQUIVALENT OF A PAPER MACHINE

(75) Inventors: Seppo Parviainen, Kuopia; Jaakko Reivo, Jyvaskyla; Jouko Pelkonen, Saynatsalo; Raimo Tolvanen, Jyvaskyla, all of (FI)

(73) Assignee: Valmet Corporation, Helsinki (FI)

( * ) Notice: Subject to any disclaimer, the term of this patent is extended or adjusted under 35 U.S.C. 154(b) by 0 days.

(21) Appl. No.: 09/204,022

(22) Filed: Dec. 1, 1998

Related U.S. Application Data

(63) Continuation-in-part of application No. 09/054,876, filed on Apr. 3, 1998, now Pat. No. 5,927,909, and a continuation of application No. PCT/FI98/00279, filed on Mar. 27, 1998.

(30) Foreign Application Priority Data

Apr. 3, 1997 (FI) ...................................................... 971366

(51) Int. Cl.$^7$ ................................................. B23B 35/00
(52) U.S. Cl. ..................... 408/1 R; 408/42; 408/77; 408/92; 408/99; 408/110; 409/177
(58) Field of Search .................. 408/1 R, 42, 77, 408/79, 80, 81, 92, 99, 103, 110, 234; 409/175, 177

(56) References Cited

U.S. PATENT DOCUMENTS

| Re. 14,196 | * | 9/1916 | Lonsway | 408/77 |
|---|---|---|---|---|
| 779,174 | * | 1/1905 | Moore | 408/92 |
| 1,453,705 | * | 5/1923 | Crombie | 408/77 |
| 1,854,053 | * | 4/1932 | Millspaugh | 408/1 R |
| 2,546,957 | | 3/1951 | Ray | 164/86 |
| 2,730,334 | | 1/1956 | Sullivan | 255/51 |
| 2,753,739 | * | 7/1956 | Dreier | 82/1.2 |
| 3,174,650 | * | 3/1965 | Bellato | 81/3.33 |
| 3,688,615 | * | 9/1972 | Protze et al. | 82/70.2 |
| 3,732,025 | | 5/1973 | Miles, Jr. et al. | 408/1 |
| 3,822,958 | | 7/1974 | Lewis | 408/46 |
| 3,910,480 | * | 10/1975 | Thatcher | 228/45 |
| 3,957,387 | * | 5/1976 | Evertz et al. | 408/92 |
| 3,977,804 | | 8/1976 | Kitagawa | 408/16 |
| 4,106,880 | | 8/1978 | Anders | 408/1 R |
| 4,222,687 | * | 9/1980 | Williams | 408/79 |
| 4,297,061 | * | 10/1981 | Wolfe et al. | 409/179 |
| 4,493,595 | | 1/1985 | Klein | 408/46 |
| 4,674,925 | | 6/1987 | Thornton et al. | 408/1 R |
| 4,779,383 | * | 10/1988 | Vesterlund | 451/348 |
| 5,090,846 | | 2/1992 | Hakala et al. | 408/1 R |
| 5,334,259 | * | 8/1994 | Mizumura et al. | 136/258 |
| 5,344,259 | | 9/1994 | Rajala et al. | 408/46 |
| 5,644,828 | * | 7/1997 | Sailer et al. | 29/402.06 |
| 5,676,498 | | 10/1997 | Durney | 408/47 |
| 5,899,795 | * | 5/1999 | Penza | 408/79 |
| 5,927,909 | * | 7/1999 | Parvianen et al. | 408/1 R |

FOREIGN PATENT DOCUMENTS

| 0448947 | | 10/1991 | (EP) | D21F/5/04 |
|---|---|---|---|---|
| 0545879 | | 6/1993 | (EP) | B23B/39/16 |
| 91834 | | 5/1993 | (FI) | B23B/35/00 |
| 1813597-A1 | * | 5/1993 | (SU) | 409/175 |
| 9417944 | | 8/1994 | (WO) | B23B/35/00 |

* cited by examiner

Primary Examiner—A. L. Wellington
Assistant Examiner—Erica D. Ergenbright
(74) Attorney, Agent, or Firm—Steinberg & Raskin, P.C.

(57) ABSTRACT

Method and device for drilling holes into a mantle of a cylinder of a paper machine, in particular a drying cylinder, while the cylinder is in its site of operation in the paper machine in which a drill carriage having drill bits is supported on the cylinder being drilled. The drill carriage is locked in a fixed position relative to the cylinder being drilled the drill bits are pressed into the mantle of the cylinder to be drilled and rotating to thereby drill holes in the cylinder mantle. The drill carriage is supported on the cylinder being drilled by a first set of wheels arranged on the drill carriage during drilling and is displaced upon rotation of a second set of wheels which contact the cylinder only for axial movement and not during drilling.

16 Claims, 8 Drawing Sheets

METHOD AND DEVICE FOR DRILLING HOLES INTO THE MANTLE OF A CYLINDER OR EQUIVALENT OF A PAPER MACHINE

CROSS-REFERENCE TO RELATED APPLICATIONS

This application is a continuation of International Application PCT/FI98/00279 with an International filing date of Mar. 27, 1998 and a continuation-in-part of U.S. patent application Ser. No. 09/054,876, now U.S. Pat. No. 5,927,909 filed Apr. 3, 1998.

FIELD OF THE INVENTION

The present invention relates to a method for drilling holes into a mantle of a cylinder of a paper machine while the cylinder is in its site of operation in the paper machine. The holes are drilled into the cylinder mantle by a drilling device provided with drill bits and which is transferred after each drilling cycle to the next drilling position.

Also, the present invention relates to a drilling device for drilling holes into a mantle of a cylinder of a paper machine while the cylinder is in its site of operation in the paper machine. The device comprises a frame construction, drill bits rotatably mounted on the frame construction and drive means for transferring and rotating the drill bits during each drilling cycle.

BACKGROUND OF THE INVENTION

In the prior art, when effecting modifications to cylinders in a dryer group in a paper machine, e.g., machining or drilling drying cylinders, the drying cylinders were removed from their place and transferred away to be machined separately. Thus, in the prior art, it is known to convert ordinary non-perforated cylinders in a dryer group into so-called "Uno Vac" cylinders by making holes in the cylinder mantle. In the current assignee's Finnish Patent No. 91,135 (corresponding to U.S. Pat. No. 5,090,846, incorporated by reference herein), a method and a device are described by whose means the perforation of the cylinder mantle can be carried out on the site in the paper mill without removing or detaching the cylinder. In this arrangement, a drilling machine moves on support of separate guides in the axial direction of the roll. During the machining process, the drilling unit is supported both on the mantle face of the cylinder to be machined and on the mantle face of an adjacent cylinder. The drilling unit includes a spindle box of a multi-spindle drilling machine which comprises a unit for rotation of the drill bits and connected power transmission means for transferring the rotation to all of the adjacent drill bits at the same time. The drilling unit further comprises a cylinder by whose means the jig of the drill bits, i.e., the drill guide, is displaced or guided into contact with the mantle face of the cylinder to be machined. In this case, since the equipment rests both against the cylinder to be machined and against this adjacent second cylinder, which constitutes a support base for the guides, a continuous, robust construction is formed during machining, which permits a drilling free of disturbance. The drilling unit further comprises a spindle box displaceable with respect to the main frame and in this box, a separate motor for displacing the spindle box with its drills. Further, the drilling unit includes a motor for rotating the drill bits. The drill bits are arranged to drill holes in a horizontal direction.

In the construction in accordance with Finnish Patent No. 91,135, the drill bits are placed in a fixed position in relation to one another. In such a case, the spacing of the grooves on the roll must also be fixed, because it is preferable that the perforations are placed expressly in the bottoms of the grooves. However, the spacing of grooves can vary from cylinder to cylinder.

With further respect to the prior art, reference is also made to the current assignee's Finnish Patent No. 91,834 (corresponding to U.S. Pat. No. 5,334,259, in which an arrangement is described for improving the method and the equipment in accordance with the Finnish patent mentioned above. In this improved arrangement, the spacing of adjacent drill bits in the drill equipment can be adjusted in a desired way.

A drawback of the prior art constructions is that the installation of the guides necessary for fastening of the drill guide has been time-consuming, and in some cases, there has not been enough space to fasten the guides to the cylinder adjacent to the cylinder to be drilled, e.g., if a machine construction with dense spacing of cylinders and a narrow gap between cylinders is involved.

It is a further drawback of the prior art constructions that, in some cases, it has not been possible to carry out the drilling of the holes by means of the drill guide immediately from the edge of the cylinder, but the holes to be placed in the edge areas have had to be drilled manually.

It may be considered a further drawback in the prior art constructions that, when drilling takes place from the side (in a horizontal direction as in both Finnish patents referenced above) or from below (vertically upward), chips etc. may enter into the drill guide and cause problems and also, their removal is problematic.

OBJECTS AND SUMMARY OF THE INVENTION

Accordingly, an object of the present invention is to provide overall solutions for the problems and drawbacks mentioned above.

Another object of the present invention is further development of the prior art methods and constructions described above so that the fixing of a drilling device in connection with a cylinder to be machined is simpler and thus quicker than in the prior art arrangements.

It is a further object of the present invention to provide an arrangement in which drill chips do not disturb the operation of the device, in which the chips can also be vacuumed during drilling, and in which the edge areas of the cylinder can also be drilled.

It is still another object of the present invention to provide a method and apparatus to enable accurate drilling or machining of a mantle of a cylinder at its site of operation.

With a view to achieving the above objects and others, in the method in accordance with the invention, the device for drilling holes in a cylinder mantle is supported on the cylinder being drilled, which is situated in a staggered relationship with other supporting cylinders. Before the drilling is started, the device is locked in place in a desired position. By means of drill bits of the device, the holes are drilled in the cylinder in a downward direction. The drill carriage is transferable in an axial direction of the cylinder being drilled to additional fixed positions relative to the cylinder being drilled. Also, the cylinder to be drilled is rotatable while the drill carriage is locked in its axial position over a certain angular distance so as to drill the holes into different circumferential portions of the cylinder mantle.

The drill carriage may be supported on the cylinder being drilled by arranging a first set of wheels on the drill carriage, positioning these wheels on the cylinder to be drilled prior to drilling, and fixing or locking the wheels in position on the grooves prior to drilling. The fixing of the wheels may entail tightening a belt passing around the cylinder being drilled and controlling tension of the belt by means of an actuator to tighten the belt to fix the wheels and to loosen the belt in order to allow movement of the wheels in the grooves upon rotation of the cylinder (but without axial movement of the drill carriage). In use, the locking of the wheels is released while the wheels are maintained in contact with the cylinder such that the cylinder is rotatable but the drill carriage is not displaceable in an axial direction. The cylinder is rotated while the drill carriage is locked in its longitudinal or axial position over a certain angular distance so as to position the drill carriage over different circumferential portions of the cylinder mantle. The wheels are thus fixed at each different location until the entire circumference of the cylinder mantle is drilled and then the drill carriage is moved axially, fixed in position, and then rotated about the circumference. This process continues until, e.g., the entire cylinder mantle is drilled.

Transfer wheels may be arranged on the drill carriage for enabling axial movement of the drill carriage. To this end, the transfer wheels are moved from a first position in which they are out of contact with the cylinder being machined and the other wheels described above are in contact with the cylinder being machined to a second position in which the transfer wheels are in contact with the cylinder being machined and the other wheels are out of contact with the cylinder being machined. The drill carriage is axially moved upon rotation of the transfer wheels.

Further, an axially extending movement mechanism may be arranged on each side of the drill carriage for enabling axial movement of the drill carriage. Each movement mechanism includes transfer wheels and an actuator for displacing the same relative to the cylinder being drilled such that the second set of wheels are movable into and out of contact with the cylinder being drilled.

The device in accordance with the invention comprises a frame, drill bits mounted on the frame, a drive gear for transferring and rotating the drill bits, a support arrangement for supporting the frame on the cylinder to be drilled and a locking arrangement for locking the frame in a fixed drilling position relative to the cylinder to be drilled. The locking arrangement enables the frame to be easily and quickly fastened in place in order to perform the drilling operation and also moved to different drilling locations.

As a result of the shortened fastening time, a saving of time of several hours for each cylinder to be drilled is achieved by means of the device of the invention, and in addition thereto, during drilling, it is possible to work on the adjacent cylinders, for example, to replace the ends or perform other servicing operations.

Another advantage of preferred embodiments of the invention is that the drilling operation is performed downwards with the result that drilling chips and the like do not cause any problems.

In certain embodiment of, the invention the device rests on cylinders situated on a higher level, i.e., in an upper row, with respect to the cylinder to be drilled and adjacent thereto or on the cylinder to be drilled and on the adjacent cylinders situated on a higher level without separate guides, whereby it is possible to also drill the edge areas of the cylinder, while the device is able to move substantially over the entire length of the cylinder. The device drills holes from above downward, and the drills are attached to the drill guide by means of a clamp bushing. During transfer of the device, the device rests on wheels provided at the ends of the fastening supports of the device. The wheels are preferably spring-loaded and supported on the above-mentioned adjacent supporting cylinders situated on a higher level or on the cylinder to be drilled. The device is tightened and locked in place in a drilling position by means of an actuator, preferably a pneumatic cylinder.

In this embodiment, the fastening supports may have a telescopic construction and the device can be fastened in cylinder gaps of varying widths because the fastening supports of the device can be extended because of their telescopic structure. When needed, separate fastening means can be fixed to special places in connection with the device. Moreover, when needed, the device can be fastened to the guides used today and described in the current assignee's earlier patents.

The drill guide plate of the device comprises a guide pin or a wheel which guides the drill carriage to a correct position with respect to a groove and, in addition, the drill guide plate is provided with lubrication ducts for lubricating the bits. Preferably, each spindle box includes fifteen drills, but the number of drills may be increased, if needed. The spacing between the drills is fixed or adjustable in the manner described in the current assignee's above-mentioned patents. The drills are preferably attached to the guide plate by means of a clamp chuck.

Important advantages of the method and the device in accordance with the invention is the quickness of mounting and the quickness of the drilling process. The device is easy to mount, and it is suitable for various gaps between rolls.

The invention will be described in detail with reference to some preferred embodiments of the invention illustrated in the figures in the accompanying drawings. However, the invention is not confined to the illustrated embodiments alone.

BRIEF DESCRIPTION OF THE DRAWINGS

Additional objects of the invention will be apparent from the following description of the preferred embodiment thereof taken in conjunction with the accompanying non-limiting drawings, in which.

DETAILED DESCRIPTION OF THE PREFERRED EMBODIMENTS

Figure 1:
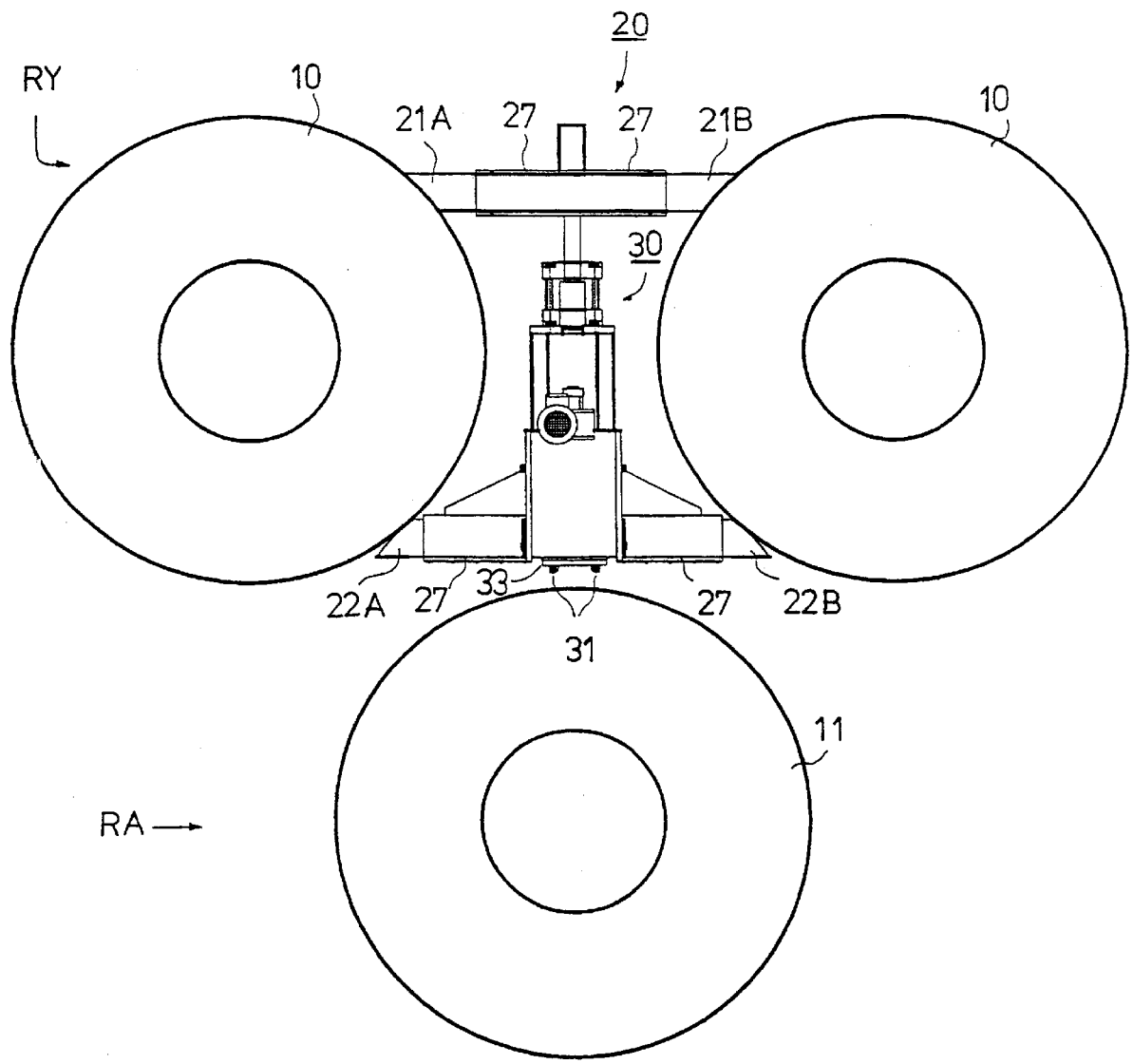
FIG. 1 is a schematic illustration of a device in accordance with the invention in a machining situation between cylinders and which is used in a method in accordance with the invention.
Figure 3:
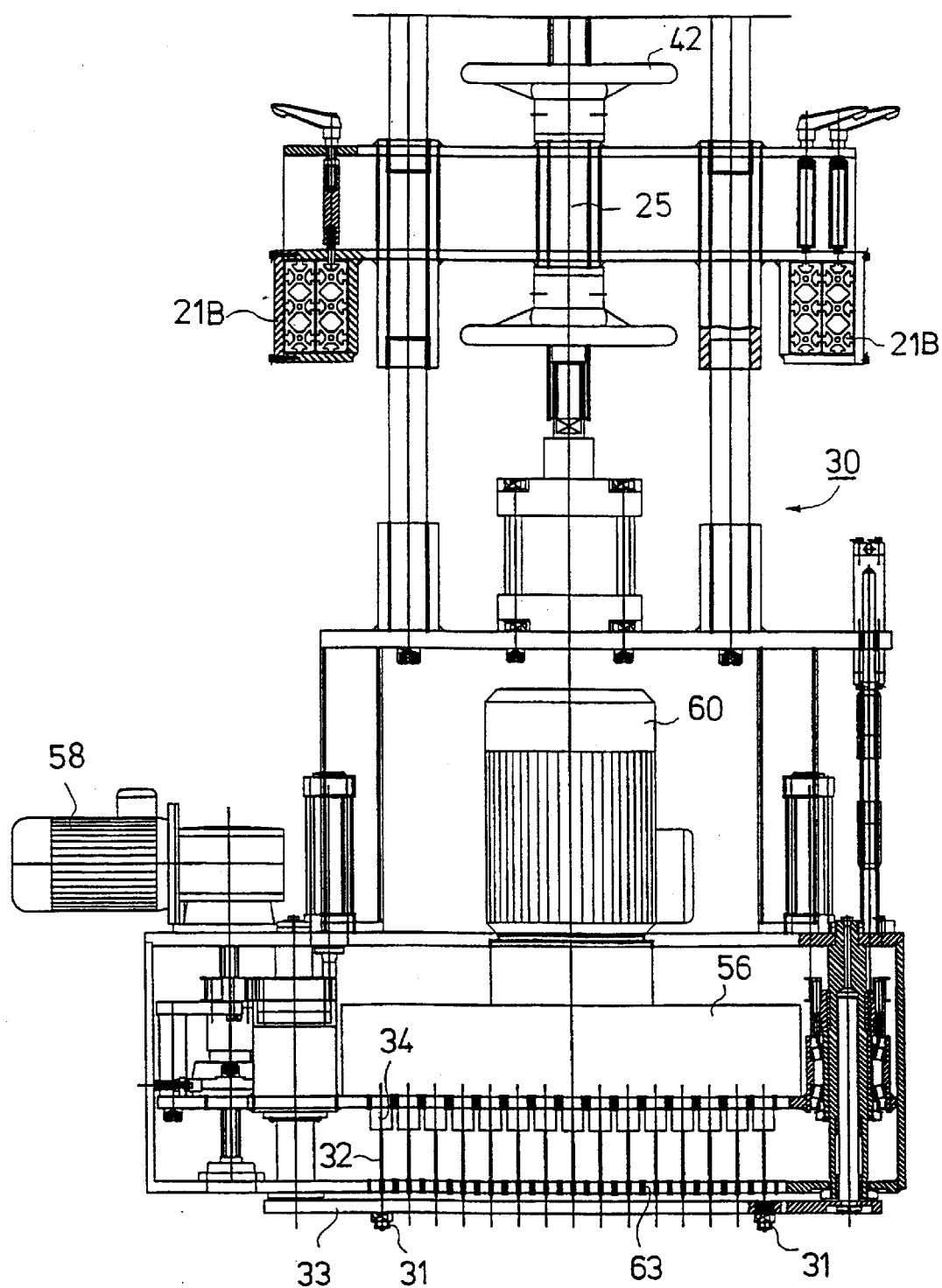
FIG. 3 is a schematic illustration of a device in accordance with the invention provided with drills and which is used in a method in accordance with the invention.

Referring to the accompanying drawings wherein like reference numerals refer to the same or similar elements, as shown in FIG. 1, a drilling device 20 is arranged in a space between adjacent cylinders 10 in an upper row RY of cylinders and above a cylinder 11 arranged in a lower row RA of cylinders below a gap between the cylinders 10, cylinder 11 being the cylinder to be drilled. Cylinders arranged in this type of arrangement are often considered to be in an interlocking or staggered relationship. The drilling device 20, which is also referred to as a drill guide, rests on support of the cylinders 10 in the upper row RY by means of fastening supports 21A,21B,22A and 22B. The fastening supports 21A,21B,22A,22B have a telescopic structure 27 so that they are adjustable to different lengths, and therefore they can be fixed to cylinder gaps of different widths. Drilling device 20 includes a frame or frame construction 30 on which the devices needed for drilling holes on the mantle of cylinder 11 are mounted, e.g., guide studs or pins 31 for guiding the drilling of the holes via drill bits 32 (FIG. 3). The fastening supports 21A–22B of the drilling device 20 are attached to each vertical end of the frame construction 30, i.e., an upper end and a lower end, and they extend in the horizontal direction to the adjacent cylinders 10.

Figure 2:
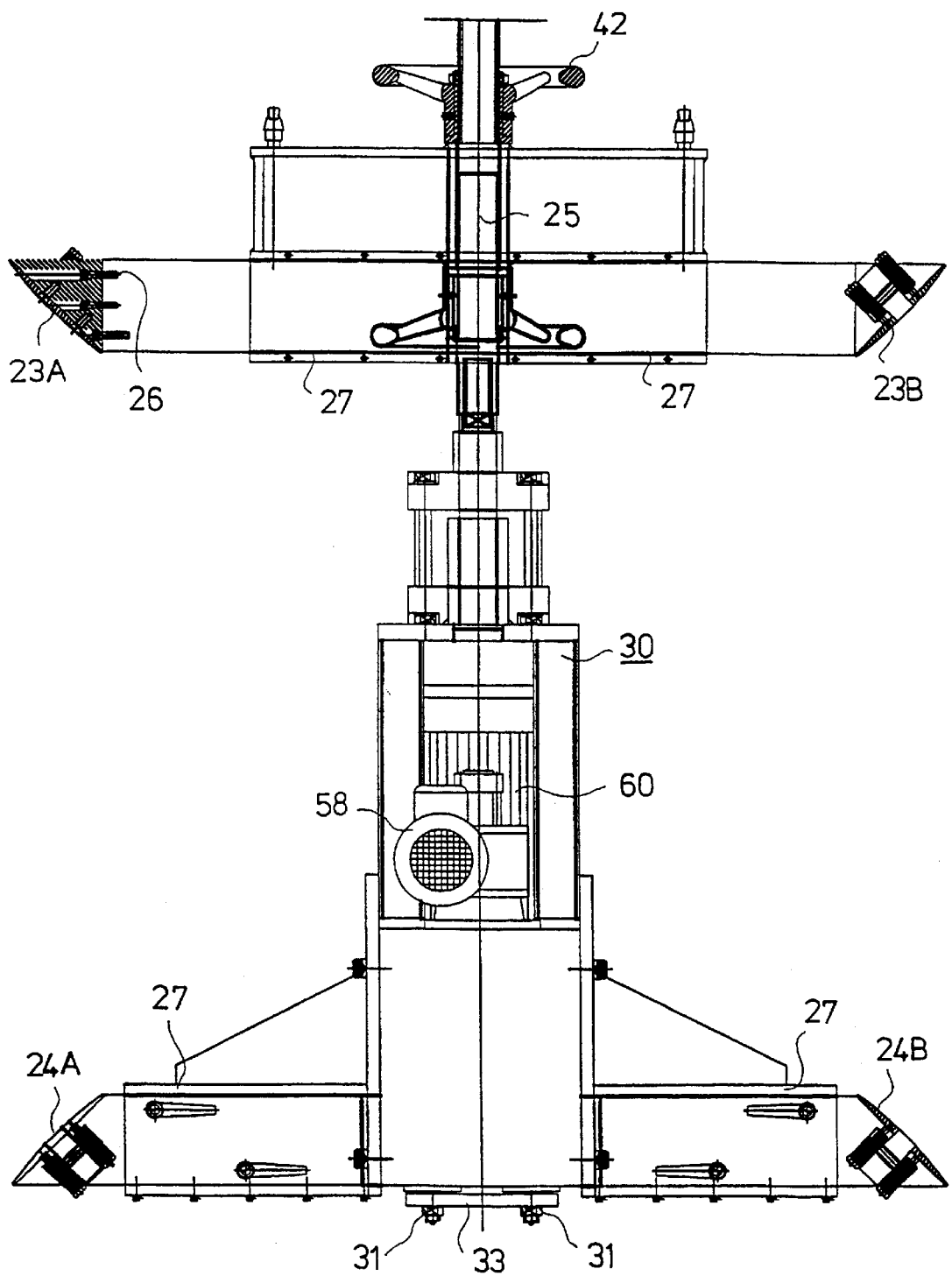
FIG. 2 is a schematic illustration in more detail of a device in accordance with the invention and which is used in a method in accordance with the invention.

FIG. 2 is a more detailed illustration of the drilling device 20 in accordance with the invention, and as shown therein, spring-loaded wheels 23A,23B,24A,24B are attached to the end of each fastening support 21A–22B. The springs of the wheels 23A–24B are denoted by reference numeral 26. The device 20 is shifted in a longitudinal or axial direction of cylinder 11 on support of the wheels 23A–24B to each desired drilling position, after which the device 20 is tightened and locked in its position by means of an actuator, preferably a pneumatic cylinder 25.

By means of drill bits 32 arranged in connection with the frame 30, holes are drilled into the bottom of the groove provided in the mantle of the cylinder 11. Each set of holes drilled while the drilling device 20 is at a specific position is considered a drilling cycle. While drilling the holes, lubricant for the drilling is passed through a guide plate 33 of the drilling device 20 to the holes. After the drilling device 20 has been transferred to its place between the cylinders 10, it is set in the desired drilling position, tightened and locked in its place. After the holes corresponding to one revolution of the cylinder have been drilled into the cylinder 11 to be perforated, i.e., the drilling cycle is completed, the pneumatic cylinder 25 is opened, and the device 20 is shifted in the longitudinal (axial) direction of the cylinders 10,11 to the next drilling position to begin another drilling cycle.

As shown in FIG. 3, the drill bits 32 are attached to the frame 30 by means of a clamp chuck 34, in which case replacement of the drills 32 is relatively quick. Preferably, long-hole drills are used to provide a long reach and extension. The position of the drilling device 20 can be adjusted in the vertical direction manually, for example, by means of the wheel 42 to be as close to the cylinder 11 to be drilled as possible in order that the desired drilling quality could be obtained. In this manner, the relative distance between the drilling device 20 and the mantle of cylinder 11 is controlled. The guide plate 33 of the guide 20 is provided with lubricant ducts 63 for enabling lubrication of the drill bits 32.

The drilling device 20 also comprises a spindle box 56, to which a motor 58 for rotating the drill bits 32 is attached, motor 58 being motively coupled to drill bits 32. The rotation motor 58 is arranged to rotate all of the drill bits 32 at the same time. The spindle box 56 further comprises a motor 60 attached to it, by means of which motor 60, the spindle box 56 and the related drill bits 32 are displaced in order to produce a feed movement for the drill bits 32 and to shift the drill bits apart from the roll mantle to be drilled after the drilling. The drilling operations with the device now being discussed and the related arrangements can be accomplished in compliance with the principles described in the current assignee's Finnish Patent Nos. 91,135 and 91,834 or in any other way in itself known to a person skilled in the art.

The device 20 includes a number of drills 32, for example fifteen drills, but the number of drill bits may be selected as desired. In the exemplifying embodiment shown in FIGS. 1–3, the spacing of the drill bits 32 is fixed. The arrangement may also be adjustable in accordance with Finnish Patent No. 91,834.

Figure 4:
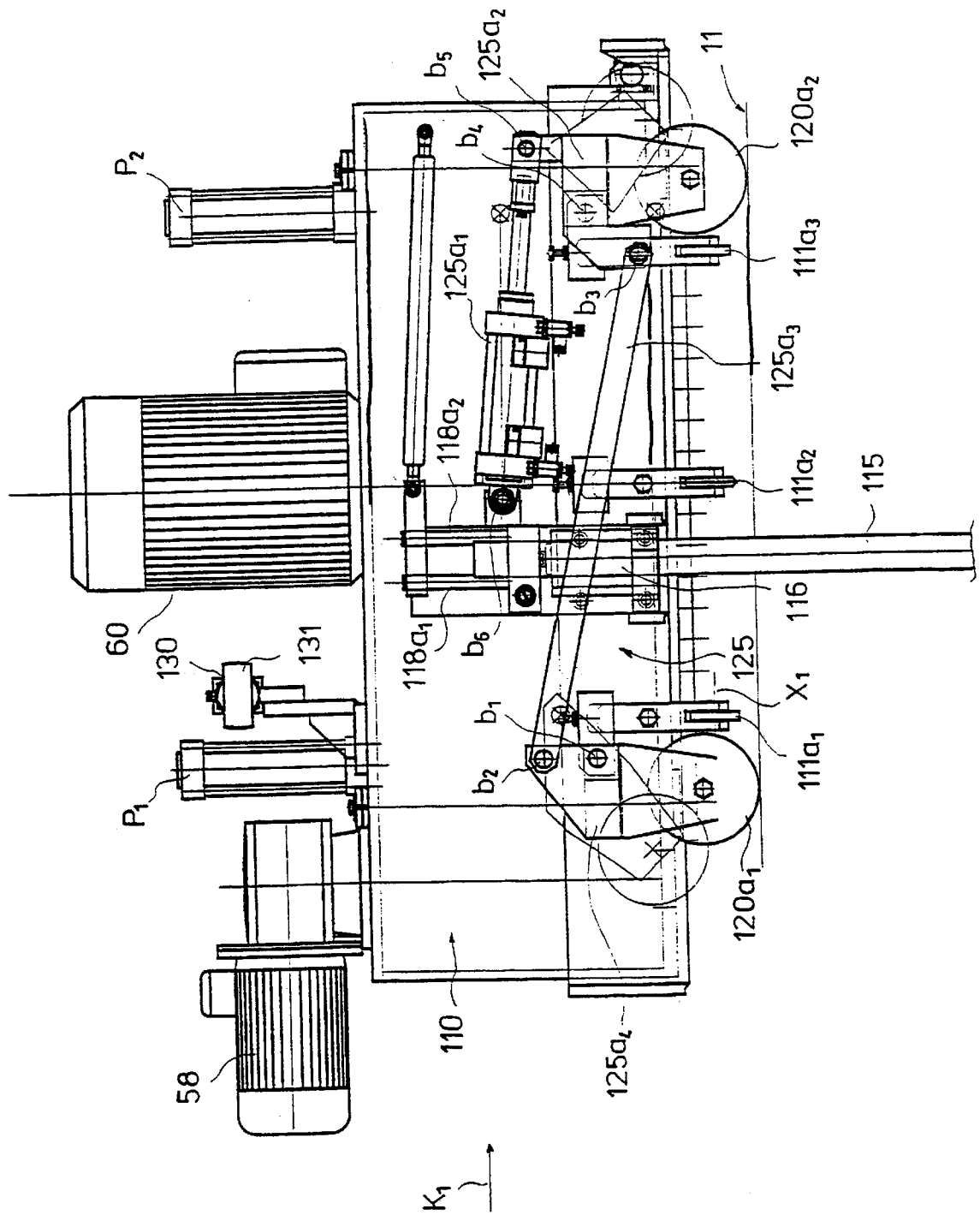
FIG. 4 shows a side view of another embodiment of the invention in which the device for drilling holes in a cylinder is formed into a drill carriage.

FIG. 4 shows another embodiment of the invention from the side. In this embodiment, the drilling device 20 comprises a drill carriage 110 including a set of wheels and drill bits 32 by means of which a number of holes $R_1, R_2, \ldots$ are simultaneously drilled in circumferential grooves $U_1, U_2, \ldots$ of the cylinder 11 through the cylinder mantle. The feed and rotation drive means of the drill bits 32 is similar to that in the embodiment shown in FIGS. 1–3.

When referring to a cylinder to be drilled in connection with the disclosed embodiments, a mantle of a roll to be perforated is also intended.

The drill carriage 110 comprises support means for supporting the drill carriage 110 on the cylinder 11. As shown, the support means comprise a first set of wheels $111a_4$, $111a_2$, $111a_3$ on one side (FIG. 4) and aligning wheels $111a_4$, $111a_5$, $111a_6$ on the other side (of which only wheel $111a_4$ is shown—FIGS. 5 and 9). The wheels $111a$ are arranged to rotate in their bearings and are connected to the drill carriage 110. The axes $X_1$ of rotation of the wheels $111a$ are arranged to be substantially parallel to the axis X of rotation of the cylinder 11 to be machined. During drilling operations, the wheels $111a$ are arranged to be positioned in grooves $U_1, U_2$ of the cylinder 11, in which grooves the perforations $R_1$, $R_2, \ldots$ are made by the drill bits 32. The holes $R_1, R_2, \ldots$ thus extend from the bottom of the grooves $U_1, U_2, \ldots$ through the cylinder mantle into the interior of the cylinder 11.

The apparatus further includes locking means for locking the drill carriage 110 in fixed drilling position relative to the cylinder 11. In the non-limiting illustrated embodiment, the locking means comprise a belt 115 passing around the cylinder 11 to be machined or drilled and which can be tightened and loosened by means of an actuating cylinder 116, preferably a pneumatic cylinder. Preferably, there is at least one belt 115, but more than one are possible. Prior to drilling of the bores into the cylinder 11 such that the bores $R_1, R_2, \ldots$ extend to the circumferential grooves $U_1$, $U_2, \ldots$ of the cylinder through the cylinder mantle, the belt 115 is tightened around the cylinder 11 that is being machined. In that connection, the wheels $111a$ are placed so as to be supported on the edges of circumferential grooves $U_1, U_2, \ldots$ of the cylinder 11 that is being machined. The drilling device then drills the bore holes into the cylinder mantle and, after the machining operation has taken place, the tension of the belt 115 is released and the cylinder 11 is rotated to the next drilling position, after which the belt 115 is tightened again and the drilling operation is accomplished in a new angle position, i.e., at a different circumferential portion of the cylinder.

After certain grooves $U_1, U_2, U_3, U_4, \ldots$ of the cylinder 11 have been drilled over the entire circumferential length of the grooves $U_1, U_2, \ldots$, the drill carriage is transferred forward (longitudinally or axially) above the cylinder 11 on support of a second set of wheels, so-called transfer wheels $120a_1, 120a_2, 120a_3, 120a_4$. The wheels $120a_1, 120a_2$ are coupled to a linkage and movement mechanism 125. The linkage of the linkage mechanism is moved by means of an actuator $125a_1$ of the linkage mechanism such that the wheels $120a_1, 120a_2, 120a_3$ and $120a_4$ associated with the linkage lift the carriage 110 so that the wheels 111a of the carriage in the grooves $U_1, U_2$ are detached from the surface of the groove, and the carriage can be transferred in a position above the cylinder 11 in the direction of the axis X of the cylinder 11 forward to the next drilling position.

Figure 5:
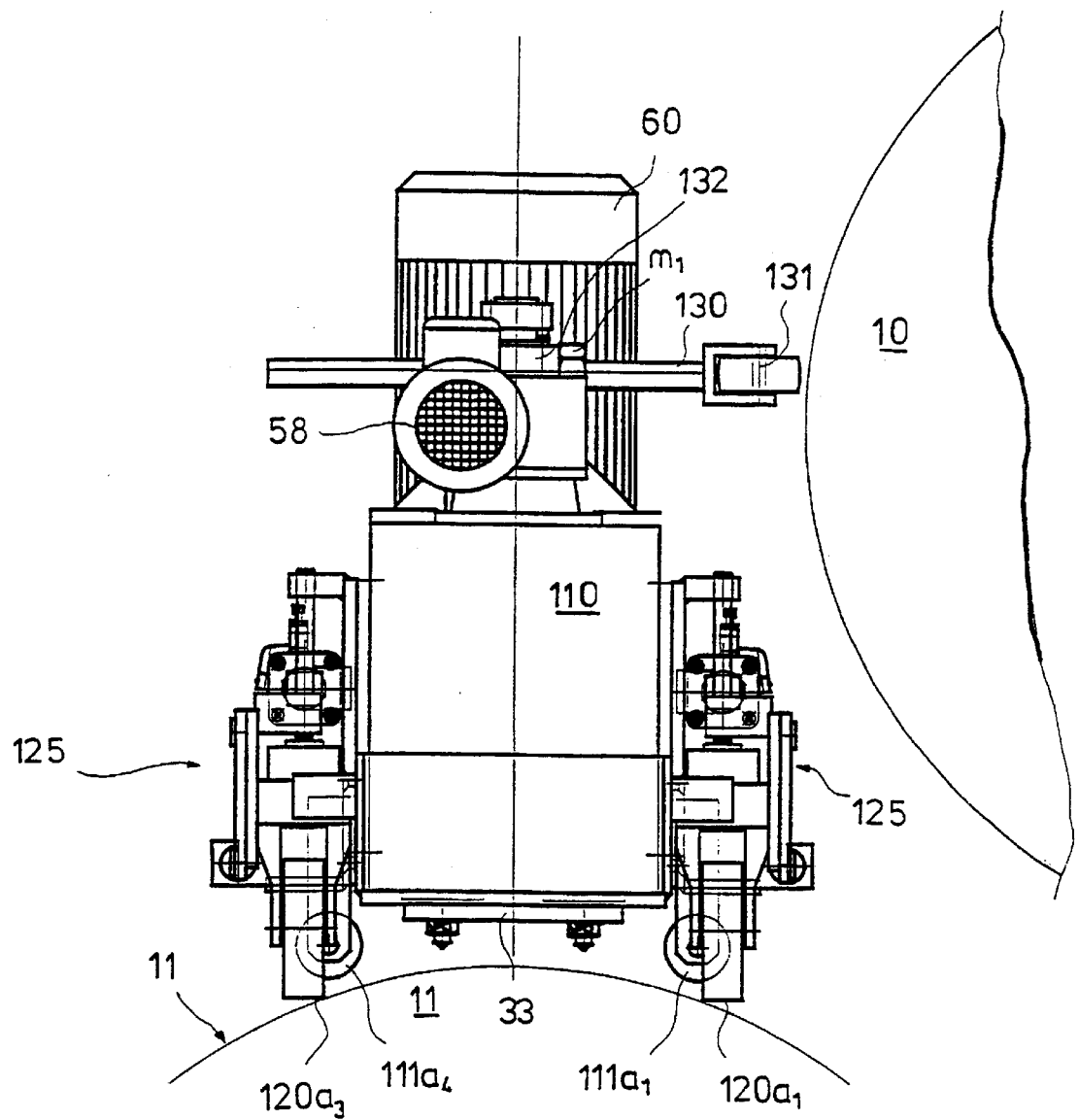
FIG. 5 shows the device arrangement of FIG. 4 in the direction of the arrow $K_1$ in FIG. 4.

FIG. 5 shows the drill carriage 110 in the direction of the arrow $K_1$ in FIG. 4. The drill carriage 110 comprises the same kind of transfer linkage mechanisms 125 for the wheels $120a_1, 120a_2, 120a_3$ and $120a_4$ on both sides of the drill carriage 110.

By employing the actuator of the mechanism associated with the wheels $120a_1, 120a_2$, the wheels $120a_1, 120a_2, 120a_3, 120a_4$, can be lifted and lowered such that the carriage 110 can be lifted upwards from the upper face of the cylinder, in which connection the support wheels $111a_1, 111a_2, \ldots$ are detached from the grooves $U_1, U_2, \ldots$ The drilling device itself with its drill bits 32, being situated inside the frame of the carriage 110, comprises a number of drill bits 32 placed in one or more rows, whereby the drilling operation is carried out simultaneously in a number of different grooves $U_1, U_2, \ldots$ The frame of the drill carriage 110 is open at the bottom. In the side view of the carriage shown in FIG. 5, the drill guide 33 comprises actuating cylinders $P_1, P_2$, whereby the drill guide 33 can be moved into contact with or as close as possible to the face to be drilled in order to support the drill bits 32. The drill guide 33 may also be in a fixed position with respect to the drill carriage 110.

The drill carriage 110 can be transferred on the upper face of the cylinder 11 to the next drilling position. Before the above-mentioned steps, the belt 115 is loosened by releasing the pressure from the cylinder device 116, preferably a pneumatic cylinder.

Figure 6:
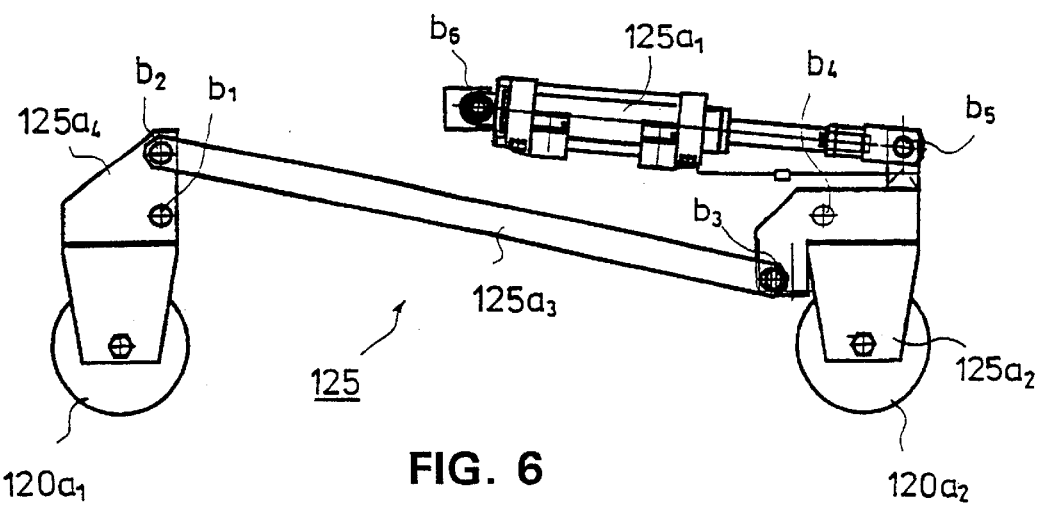
FIG. 6 is a separate view of a mechanism associated with so-called transfer wheels for moving the transfer wheels.

FIG. 6 is a separate view of the mechanism 125 associated with the transfer wheels $120a_1, 120a_2$.

The mechanism 125 shown in FIG. 6 comprises the cylinder device $125a_1$ as an actuator coupled to a pivot arm $125a_2$ which is linked pivotally with respect to the drill carriage 110. Further, an intermediate lever $125a_3$ is coupled to the pivot arm $125a_2$, which intermediate lever transmits the motion of the arm of the cylinder device $125a_1$ further to a second pivot arm $125a_4$. The wheel $120a_2$ is connected to the pivot arm $125a_4$ and the wheel $120a_2$ is connected to the other pivot arm $125a_2$. The pivot arm $125a_4$ is pivotally linked by means of an articulated joint $b_1$ so as to be pivotal with respect to the frame of the carriage 110. Similarly, the pivot arm $125a_2$ is pivotally linked to the frame of the carriage 110 by means of an articulated joint $b_4$. The intermediate lever $125a_3$ is pivotally linked to the pivot arm $125a_4$ by means of an articulated joint $b_2$ and to the pivot arm $125a_2$ by means of an articulated joint $b_3$. A similar mechanism 125 is situated on the other side of the carriage 110, and the mechanisms 125 are operated simultaneously. The cylinder device $125a_2$ is connected to the carriage 110 by means of an articulated joint $b_6$ and to the pivot arm $125a_2$ by means of the articulated joint $b_5$ in the cylinder arm.

Figure 7:
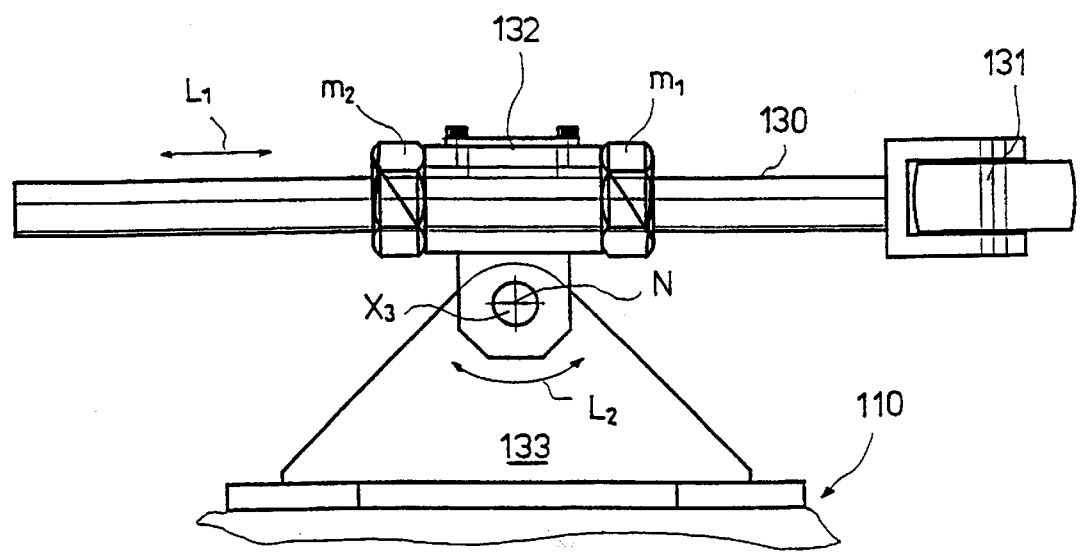
FIG. 7 shows a support rod associated with the drill carriage for supporting the drill carriage when the cylinder that is being drilled is rotated to a new drilling position.

As shown in FIG. 7, for supporting the drill carriage 110 on a cylinder adjacent to the cylinder being drilled or machined, the device 20 comprises a support rod 130 associated with the drill carriage 110 and an end roller 131 at one end of the support rod 130, the end roller 131 being able to come into contact with a cylinder 10 adjacent to the cylinder 11 that is being machined when the cylinder 11 is rotated in order to achieve a new angle position for the next drilling cycle. The support rod 130 can be positioned in a sleeve 132 of the carriage 110, and the support rod 130 can be positioned linearly (arrow $L_1$) so as to be supported on an adjacent cylinder 10 on either side of the cylinder 11 depending on the direction of rotation in which the cylinder 11 is rotated to attain a new angle position for drilling. The support rod 130 comprises threads and locking nuts $m_1$ and $m_2$ by means of which the support rod 130 can be locked in a desired position. Further, the sleeve 132 can be turned in an articulated joint N about an axis $X_3$ with respect to a bracket 133 connected to the carriage 110.

Figure 8A:
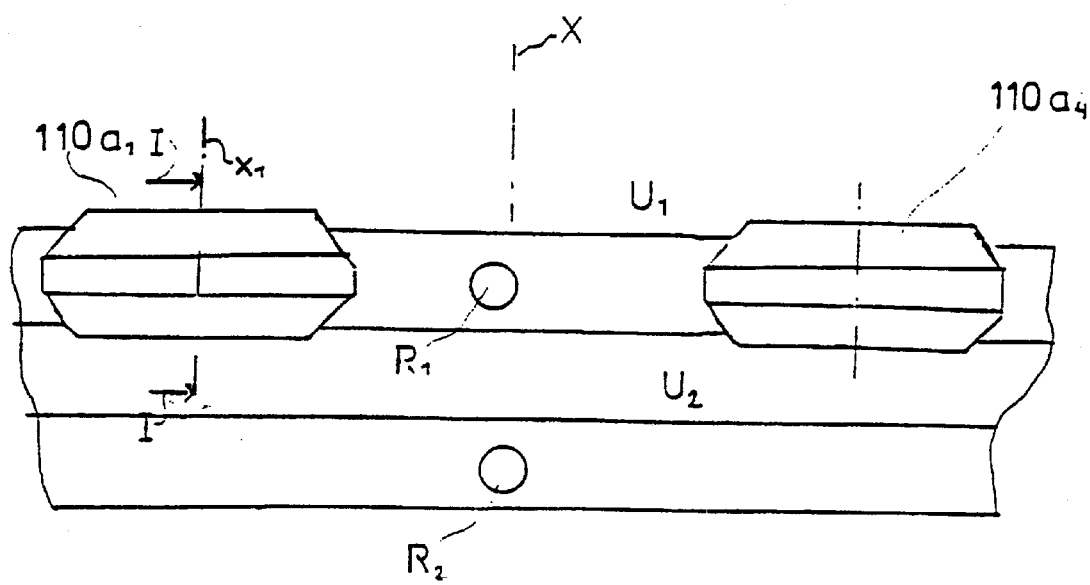
FIG. 8A illustrates the location of support wheels in a circumferential groove situated in the surface of the cylinder to be machined when a hole or holes is/are drilled such that the bores extend through the bottom of the groove and thus through the mantle face of the cylinder.

FIG. 8A illustrates the drilling operation in accordance with the invention. During drilling, the wheels 111a of the drill carriage 110 are placed in a groove $U_1$ of the cylinder 11. The drilling operation is performed by means of the drill bits 32 of the drill carriage 110 while the wheels 111a situated in the groove $U_1$ support the drilling operation and enable the cylinder 11 to be rotated to place the cylinder 11 that is being drilled in a new angle position.

Figure 8B:
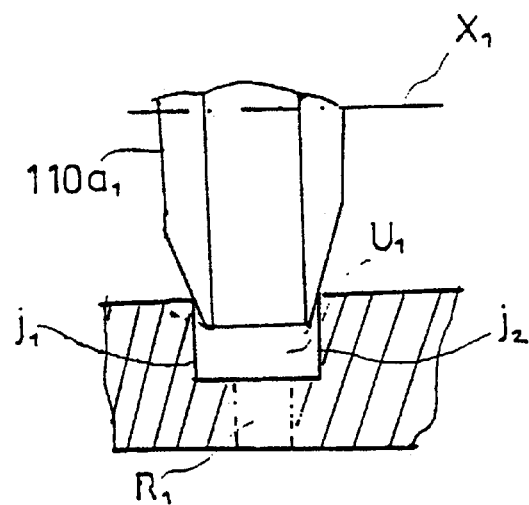
FIG. 8B shows a section I—I from FIG. 8.
Figure 9:
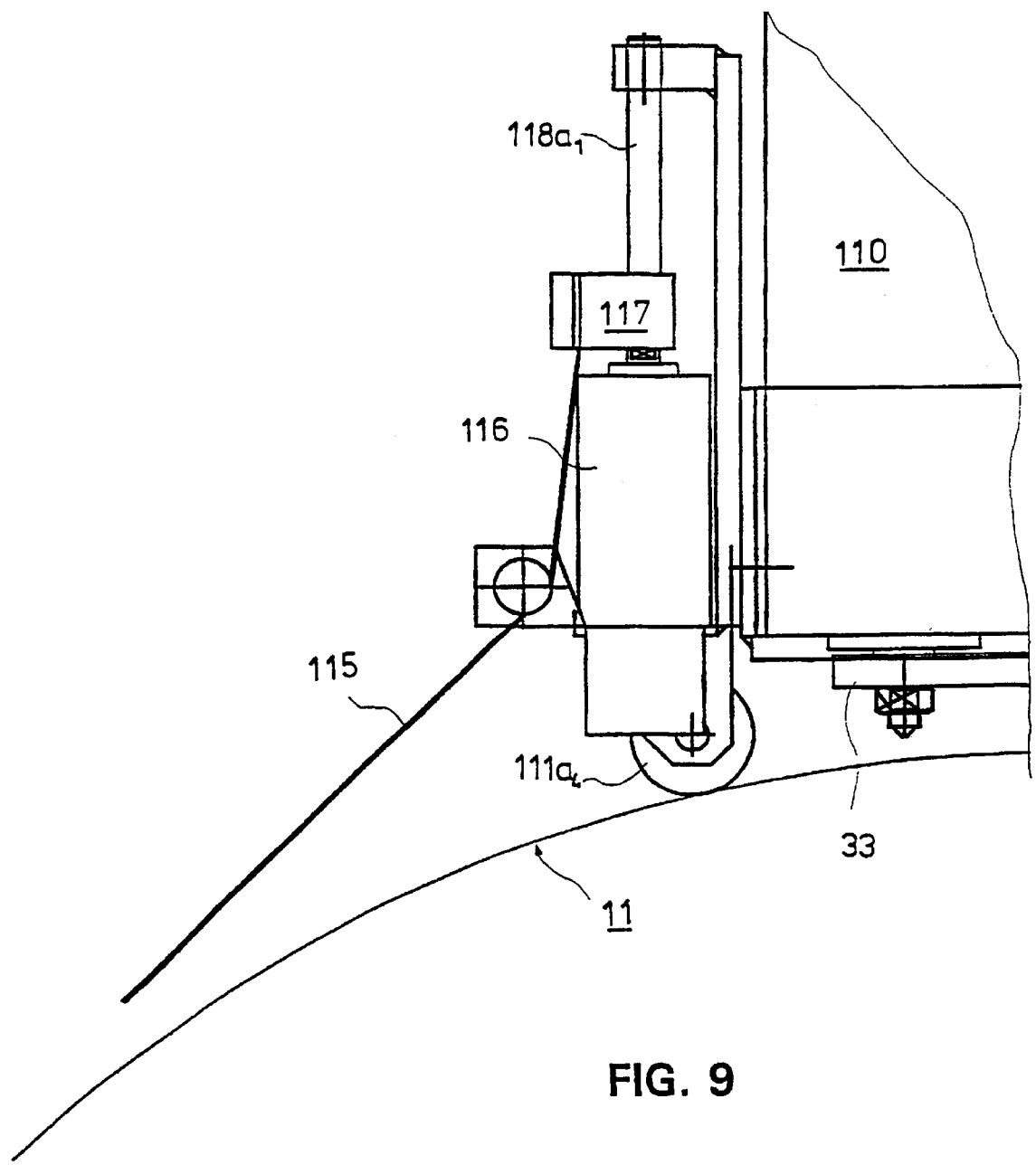
FIG. 9 illustrates the fastening of a belt passed around a cylinder to be drilled to a cylinder device that tightens the belt.

FIG. 8B is a sectional view I—I of FIG. 8A. The wheels 111a are supported on edges $j_1, j_2$ of the grooves $U_1, U_2, \ldots$ FIG. 9 shows the coupling of the belt 115 passed around the cylinder 11 to the cylinder device 116. The belt 115 is supported through an attachment part 117 on vertical auxiliary guides $118a_1, 118a_2$. The belt 115 itself is moved on support of the auxiliary guides $118a_1, 118a_2$. The auxiliary guides $118a_1, 118a_2$ prevent torques from being exerted on the rod of the cylinder device 116.

Thus, by means of the device arrangement of the invention described above, the drilling of cylinders can be performed such that the bore extends from the circumferential grooves of the cylinders through the cylinder mantle. The device in accordance with the invention, when situated in a position above the cylinder 11, enables the cylinder mantle to be perforated as so-called on-site drilling so that the cylinder need not be removed out of connection with a paper machine/board machine. The cylinder can be drilled on site in a paper mill. During drilling of the cylinder, the carriage 110 is supported on the upper surface of the cylinder 11 that is being drilled and, when the drilling position is changed by rotating the cylinder that is being drilled, the drill carriage is additionally supported on an adjacent cylinder 10 by means of the support arm 130. Thus, during drilling, the drill carriage 110 is placed on the upper face of the cylinder that is being drilled in such a way that the wheels 111a of the drill carriage 110, whose axis $X_1$ of rotation is parallel to the axis X of rotation of the cylinder that is being drilled, are situated in circumferential grooves $U_1, U_2, \ldots$ of the cylinder/roll. During drilling, the drill carriage 110 is held in contact with the cylinder that is being drilled by tightening the belt 115 around the cylinder that is being drilled. The tightening of the belt 115 may take place by means of the cylinder device 116, preferably a pneumatic cylinder.

The examples provided above are not meant to be exclusive. Many other variations of the present invention would be obvious to those skilled in the art, and are contemplated to be within the scope of the appended claims. Thus, the invention has been described above only with reference to some of its advantageous embodiments. However, the invention is not intended to be narrowly confined to the disclosed embodiments. Numerous variations and modifications are possible within the scope of the inventive idea defined in the following claims. For example, it is pointed out that for the most part, a description of a drilling device including drill bits is described above. However, the actuating mechanisms, e.g., the sets of wheels, could be used in connection with a different machining device if a machining process other than drilling is desired. Furthermore, the apparatus described above does not necessarily have to be used with the drill bits operating in a downward direction. Although it is a preferred embodiment when the drill bits operate in a downward direction because there is no problem of drill chips formed during the drilling disturbing the drilling operation, the drilling device described above could be fixed in positions around the cylinder being drilled, e.g., by means of the belt, so that the drill bits operate in other directions without deviating from the scope and spirit of the invention. The method and apparatus may also be used for any type of cylinders, not necessarily drying cylinders of a paper machine.

We claim:

1. A method for drilling holes into a mantle of a cylinder of a paper machine while the cylinder is in its site of operation in the paper machine, wherein said cylinder to be drilled includes circumferential grooves and an axis, comprising the steps of:

supporting a drill carriage having drill bits on the cylinder being drilled, said step of supporting said drill carriage on said cylinder being drilled comprises the steps of:
arranging a first set of wheels on said drill carriage;
positioning said first set of wheels on edges of said grooves of the cylinder to be drilled prior to drilling; and
fixing said first set of wheels in position on said grooves prior to drilling;
locking the drill carriage in a fixed position relative to the cylinder being drilled, and
pressing the drill bits into the mantle of the cylinder to be drilled while rotating the drill bits to thereby drill holes in the cylinder mantle.

2. The method of claim 1, further comprising the step of:
transferring the drill carriage to additional positions relative to the cylinder being drilled.

3. The method of claim 2, wherein the step of transferring the drill carriage comprises the step of displacing the drill carriage in an axial direction of the cylinder being drilled.

4. The method of claim 1, further comprising the step of:
rotating the cylinder to be drilled over a certain angular distance while the drill carriage is locked in an axial position so as to drill the holes into a circumferential portion of the cylinder mantle.

5. The method of claim 1, wherein the first set of wheels is arranged to have an axis of rotation parallel to an axis of rotation of the cylinder being drilled.

6. The method of claim 1, wherein the step of fixing the first set of wheels in position comprises the step of tightening a belt passing around the cylinder being drilled.

7. The method of claim 6, further comprising the step of:
controlling tension of the belt with an actuating means which is used to tighten the belt in order to fix the first set of wheels in positions and which is used to loosen the belt in order to allow movement of the first set of wheels in the grooves.

8. The method of claim 1, further comprising the steps of:
releasing the fixing of the first set of wheels while maintaining the first set of wheels on the grooves such that the cylinder being drilled is rotatable and the drill carriage is not displaceable in an axial direction of the cylinder being drilled,
rotating the cylinder to be drilled over a certain angular distance while the drill carriage is locked in an axial position so as to position the drill carriage over a different circumferential portion of the cylinder mantle, and
fixing the first set of wheels at the different location such that the different circumferential portion of the cylinder mantle is drilled.

9. The method of claim 1, further comprising the step of:
arranging a second set of wheels on the drill carriage, and
transferring the drill carriage in an axial direction of the cylinder being drilled to additional fixed positions relative to the cylinder to be drilled by
moving the second set of wheels from a first position in which the second set of wheels are out of contact with the cylinder being machined and the first set of wheels are in contact with the cylinder being machined to a second position in which the second set of wheels are in contact with the cylinder being machined and the first set of wheels are out of contact with the cylinder being machined, and
axially moving the drill carriage upon rotation of the second set of wheels.

10. The method of claim 1, further comprising the step of:
arranging an axially extending movement mechanism on each side of the drill carriage for enabling axial movement of the drill carriage, each of the movement mechanisms including a second set of transfer wheels and an actuator for displacing the second set of wheels relative to the cylinder being drilled such that the second set of wheels are movable into and out of contact with the cylinder being drilled.

11. A device for drilling holes into a mantle of a cylinder of a paper machine while the cylinder is in its site of operation in the paper machine, the cylinder having an axis, said device comprising:

a drill carriage, drill bits mounted on said drill carriage, support means for supporting said drill carriage solely on the cylinder to be drilled, said supporting means being structured and arranged such that said drill bits are situated above said cylinder, with respect to the horizontal, to be drilled and such that said drill bits extend in a vertical direction, locking means arranged on said drill carriage for locking said drill carriage in a fixed drilling position relative to the cylinder to be drilled, wherein said locking means comprises:

a belt adapted to pass around said cylinder to be drilled, and
an actuator for tightening said belt to thereby fix said drill carriage in position relative to said cylinder being drilled; and drive means arranged in connection with said drill carriage for pressing said drill bits vertically downwardly while simultaneously rotating said drill bits.

12. The device of claim 11, wherein said support means comprise a first set of wheels adapted to rest on the cylinder to be drilled.

13. The device of claim 11, further comprising displacing means for displacing said drill carriage in an axial direction of the cylinder to be drilled, said displacing means comprising wheels having a first position in contact with the cylinder to be drilled in which said drill carriage is displaceable and a second position out of contact with the cylinder to be drilled, said wheels being in said second position while the cylinder is being drilled.

14. The device of claim 13, further comprising an actuator for moving said wheels between said first and second positions.

15. The device of claim 13, further comprising a support arm having a roller at one end for supporting said drill carriage on a cylinder adjacent to the cylinder being drilled.

16. A device for drilling holes into a mantle of a cylinder of a paper machine while the cylinder is in its site of operation in the paper machine, the cylinder having an axis, said device comprising:

- a drill carriage;
- drill bits mounted on said drill carriage;
- support means for supporting said drill carriage solely on the cylinder to be drilled, said supporting means comprising a first set of wheels adapted to rest on said cylinder to be drilled;
- locking means arranged on said drill carriage for locking said drill carriage in a fixed drilling position relative to the cylinder to be drilled;
- drive means arranged in connection with said drill carriage for pressing said drill bits vertically downwardly while simultaneously rotating said drill bits; and
- an axially extending movement mechanism coupled to said drill carriage for displacing said wheels relative to the cylinder to be drilled.

* * * * *